(12) United States Patent
Beeson et al.

(10) Patent No.: US 7,456,370 B2
(45) Date of Patent: Nov. 25, 2008

(54) WELDING SHIELD AND FLEXIBLE SKIRT FOR AUTOMATED WELDING

(75) Inventors: William J. Beeson, Laveen, AZ (US); Mathew S. Hoppes, Tempe, AZ (US); Joshua S. Robinson, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/343,115

(22) Filed: Jan. 30, 2006

(65) Prior Publication Data

US 2007/0175874 A1 Aug. 2, 2007

(51) Int. Cl.
*B23K 26/14* (2006.01)
*B23K 26/20* (2006.01)

(52) U.S. Cl. .............................. 219/121.63; 219/121.84

(58) Field of Classification Search ............ 219/121.63, 219/121.64, 121.84
See application file for complete search history.

(56) References Cited

U.S. PATENT DOCUMENTS

| | | | |
|---|---|---|---|
| 3,243,571 A | 3/1966 | Schmerling | |
| 3,685,882 A * | 8/1972 | Van Der Jagt | 219/121.84 |
| 3,696,230 A * | 10/1972 | Friedrich | 219/121.84 |
| 3,739,133 A | 6/1973 | Kadlez et al. | |
| 4,127,761 A | 11/1978 | Pauley et al. | |
| 4,166,940 A | 9/1979 | Barger et al. | |
| 4,359,907 A * | 11/1982 | Morin et al. | 73/863.21 |
| 4,578,554 A * | 3/1986 | Coulter | 219/121.63 |
| 4,694,825 A * | 9/1987 | Slemmer et al. | 128/205.24 |
| 4,891,489 A | 1/1990 | Bollinger et al. | |
| 5,003,150 A | 3/1991 | Stricklen | |
| 5,084,603 A | 1/1992 | Bernuchon et al. | |
| 5,191,900 A * | 3/1993 | Mishra | 600/585 |
| 5,284,298 A * | 2/1994 | Haynes et al. | 239/254 |
| 5,293,023 A * | 3/1994 | Haruta et al. | 219/121.84 |
| 5,345,054 A | 9/1994 | Li | |
| 5,484,973 A | 1/1996 | Gittens et al. | |
| 5,614,117 A | 3/1997 | Krobath | |
| 5,674,200 A * | 10/1997 | Ruschke et al. | 604/126 |
| 5,796,070 A | 8/1998 | Karp | |
| 5,977,515 A * | 11/1999 | Uraki et al. | 219/121.84 |

(Continued)

FOREIGN PATENT DOCUMENTS

JP 59-223191 12/1984

(Continued)

*Primary Examiner*—Geoffrey S Evans
(74) *Attorney, Agent, or Firm*—Ingrassia, Fisher & Lorenz, P.C.

(57) ABSTRACT

An automated welding system is provided for welding a workpiece. The system includes a multiaxially movable arm, a fiber optic cable, a laser source, a focusing head, a focus lens, and a shield. The fiber optic cable is coupled to the arm. The laser source is coupled to the fiber optic cable and configured to supply laser light thereto. The focusing head includes a first end, a second end, and a passage extending therebetween. The shield has an inlet, an outlet and a cavity formed therebetween, and each of the inlet and the outlet has a diameter. The shield inlet is coupled to the focusing head and the shield inlet diameter is greater than the shield outlet diameter. The shield outlet diameter is sized to provide an opening through which the laser beam exits and prevents substantially all particles external to the focusing head passage from entering therein.

16 Claims, 4 Drawing Sheets

U.S. PATENT DOCUMENTS

| | | | |
|---|---|---|---|
| 6,248,977 B1 | 6/2001 | Bessler et al. | |
| 6,392,184 B1 | 5/2002 | Yokota et al. | |
| 6,555,779 B1 | 4/2003 | Obana et al. | |
| 6,739,530 B1 * | 5/2004 | Shilton et al. | 239/590.3 |
| 6,772,933 B2 | 8/2004 | Dasbach | |
| 6,822,187 B1 * | 11/2004 | Hermann et al. | 219/121.63 |
| 7,112,761 B2 * | 9/2006 | Hughes et al. | 219/121.63 |
| 2002/0003133 A1 | 1/2002 | Mukasa et al. | |
| 2003/0197978 A1 * | 10/2003 | Otsuka et al. | 360/235.1 |
| 2004/0238504 A1 * | 12/2004 | Aubry et al. | 219/121.84 |
| 2005/0173379 A1 | 8/2005 | Ireland et al. | |
| 2006/0081562 A1 * | 4/2006 | Causte et al. | 219/121.84 |
| 2007/0023405 A1 * | 2/2007 | Diem | 219/121.84 |

FOREIGN PATENT DOCUMENTS

| | | |
|---|---|---|
| JP | 05131288 | 5/1993 |
| JP | 9-29465 A * | 2/1997 |

* cited by examiner

WELDING SHIELD AND FLEXIBLE SKIRT FOR AUTOMATED WELDING

TECHNICAL FIELD

The present invention relates to an automated welding apparatus and, more particularly, to a shield and a skirt for use on the automated welding apparatus.

BACKGROUND

A gas turbine engine may be used to power various types of vehicles and systems. A particular type of gas turbine engine that may be used to power an aircraft is a turbofan gas turbine engine. A turbofan gas turbine engine may include, for example, a fan section, a compressor section, a combustor section, a turbine section, and an exhaust section. The fan section is positioned at the front of the engine, and includes a fan that induces air from the surrounding environment into the engine and accelerates a fraction of this air toward the compressor section. The remaining fraction of induced air is accelerated into and through a bypass plenum, and out the exhaust section.

The compressor section is configured to raise the pressure of the air to a relatively high level. In particular, the compressor section includes an impeller that has a plurality of vanes extending therefrom that accelerate and compress the air. The compressed air then exits the compressor section, and is energized by the combustor section and flowed into the turbine section to cause rotationally mounted turbine vanes to rotate and generate energy.

Over time, certain components of the engine may become worn and may need to be replaced or repaired. For example, one or more of the impeller vanes may become deformed or damaged due to prolonged exposure to high temperature air and continuous bombardment by particles during engine operation. One impeller vane repair process involves laser welding using a conventional multi-axis welding apparatus. In this regard, a laser source provides a laser beam through optics that are mounted to a multi-axially movable arm. The optics direct the laser beam through a focusing head on the arm toward a platform configured to hold the impeller. The platform moves multi-axially relative to the arm so that the laser beam can be directed at, and therefore heat and melt filler material onto, any desired area of the impeller. A gas source provides an inert gas around the laser beam and at the impeller through a conduit that extends at least partially through the focusing head. After the impeller and filler material cools and hardens, the filled area is machined into a desired configuration.

Although conventional multi-axis welding apparatus are useful, they have certain drawbacks. For example, it has been found that particles from the surrounding environment may be attracted to the apparatus and may undesirably deposit onto the optics of the apparatus. Consequently, the particles may melt onto the optics when the laser beam is directed therethrough and may contaminate and damage the apparatus. Additionally, in some cases, the inert gas may not be adequately directed to the laser beam and impeller, which may lead to inadvertent oxidation of the filler material. Moreover, because the focusing head is generally a rigid component, the head could, during welding, unintentionally contact and damage molten portions of the impeller.

Hence, there is a need for an automated welding apparatus that is capable of preventing particles from depositing onto the optics thereof. Moreover, there is a need for an apparatus that adequately directs inert gas around the laser beam and at the impeller. Additionally, it is desirable for the apparatus to include a component that prevents the focus head from directly contacting the impeller.

BRIEF SUMMARY

The present invention provides an automated welding system for welding a workpiece. In one embodiment, and by way of example only, the system includes an arm, a fiber optic cable, a laser source, a focusing head, a focus lens, and a shield. The arm has an end and is configured to move multi-axially. The fiber optic cable is coupled to the arm. The laser source is coupled to the fiber optic cable and configured to supply laser light thereto. The focusing head includes a first end, a second end, and a passage extending therebetween. The first end is coupled to the arm end, and the passage receives at least a portion of the fiber optic cable therein. The focus lens is disposed within the focusing head passage and is in communication with the fiber optic cable. The focus lens is also configured to focus the laser light from the fiber optic cable to form a laser beam. The shield has an inlet, an outlet and a cavity formed therebetween, and each of the inlet and the outlet has a diameter. The shield inlet is coupled to the focusing head second end and its diameter is greater than the shield outlet diameter. The shield outlet diameter is sized to provide an opening through which the laser beam exits and prevents substantially all particles external to the focusing head passage from entering therein.

In another embodiment, and by way of example only, the system includes an arm, a fiber optic cable, a laser source, a focusing head, a shield, and a flexible skirt. The arm has an end and is configured to move multiaxially. The fiber optic cable is coupled to the arm. The laser source is coupled to the fiber optic cable and configured to supply laser light thereto. The focusing head includes a first end, a second end, and a passage extending therebetween. The first end is coupled to the arm end, and the passage receives at least a portion of the fiber optic cable therein. The shield has an inlet, an outlet and a cavity formed therebetween, and each of the inlet and the outlet has a diameter. The shield inlet is coupled to the focusing head second end, and the shield inlet diameter is greater than the shield outlet diameter. The shield outlet diameter is sized to provide an opening through which the laser beam exits and prevents particles from the workpiece from entering the shield. The flexible skirt is coupled to and disposed around at least a portion of the shield.

Other independent features and advantages of the preferred apparatus will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
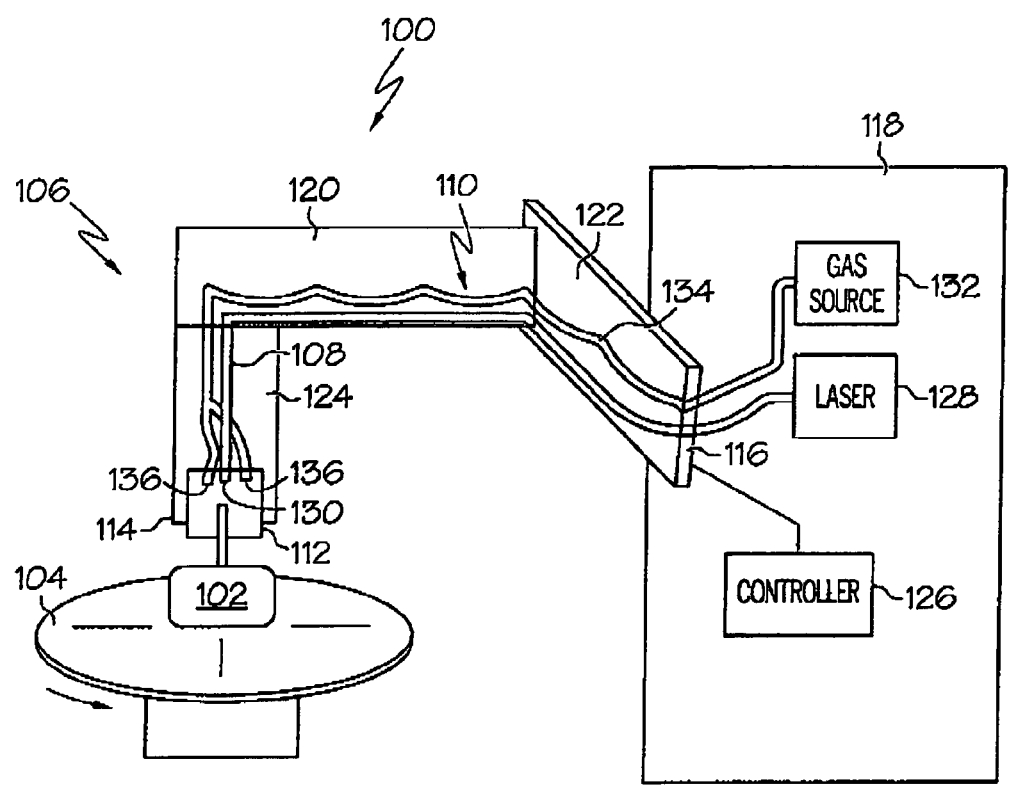
FIG. 1 is a simplified schematic of an automated welding apparatus.

FIG. 1 is a simplified schematic of an exemplary automated welding apparatus 100 including a work piece 102 disposed therein. It will be appreciated that the work piece 102 may be any one of numerous components that may need to be laser welded, such as, for example, aircraft impellers, blades, and disks. The apparatus 100 includes a platform 104, an arm 106 capable of extending over the platform 104, a fiber optic cable 108 at least partially coupled to the arm 106, a gas system 110, and a focusing head 112 disposed at one end 114 of the arm 106. Each of these components will now be discussed in more detail below.

The platform 104 is configured to hold the work piece 102 and to cooperate with the arm 106 for multi-axial welding. The work piece 102 may be secured to the platform 104 in any one of numerous conventional manners, such as via bolts or other fixturing methods. However, it will be appreciated that the work piece 102 may simply be placed on the platform 104 for easy and quick removal therefrom. The platform 104 is preferably capable of rotating and tilting in any desired direction.

The arm 106 is configured to extend at least partially over the platform 104 and to move multi-axially relative thereto. In this regard, the arm 106 preferably includes a stationary end 116 that is mounted to a desired location, such as, for example, to a base 118, and an end 114, referred to above, that not only includes the focusing head 112 but is also free to extend at least partially over the platform 104. In one exemplary embodiment, the arm 106 is made up of more than one component, such as an x-axis robotic component 120, a y-axis robotic component 122, and a z-axis robotic component 124, and the components 120, 122, 124 cooperate with one another to allow the arm free end 114 to move multi-axially. In an alternate embodiment, the arm 106 is a single component that provides capability to the arm free end 114 of moving multi-axially.

The movement of the arm 106 is controlled by a controller 126 that may be computerized or manually controlled and electrically coupled thereto or in wireless communication therewith. The controller 126, shown in FIG. 1 as being housed in the base 118, may alternatively be coupled to another portion of the apparatus 100 or may be a stand-alone unit. In addition to housing the controller 126, in some embodiments, the base 118 may also house electronic, computer, and/or display systems, or a power supply. Preferably, the base 118 is placed on or secured to a floor of a desired location or alternatively may be mounted to a wall of the desired location.

The fiber optic cable 108 is configured to transmit a laser beam to the work piece 102 during a welding operation and thus, is coupled to a laser source 128 that supplies laser light thereto. The laser source 128 may be any one of numerous conventional devices capable of supplying a laser light, such as a Nd:YAG laser. The fiber optic cable 108 also extends at least partially through a portion of the focusing head 112 and includes an exposed end 130 that allows the laser light to exit therefrom.

The gas system 110 is configured to supply gas to create an inert environment within which at least a portion of the work piece 102 may be repaired. The inert environment prevents the oxidation of the work piece 102 and any material that may be used for filler during a laser welding operation. The gas system 110 includes a gas source 132 and a channel 134. The gas source 132 contains the inert gas, which may be any inert gas conventionally used during a laser welding operation, such as, for example, argon, nitrogen, helium, carbon dioxide, or mixtures thereof. The gas source 132 may be mounted to the base 118, or alternatively, may be a separate unit. The channel 134 extends between the gas source 132 and one or more outlets 136 that terminate in the focusing head 112.

Figure 2:
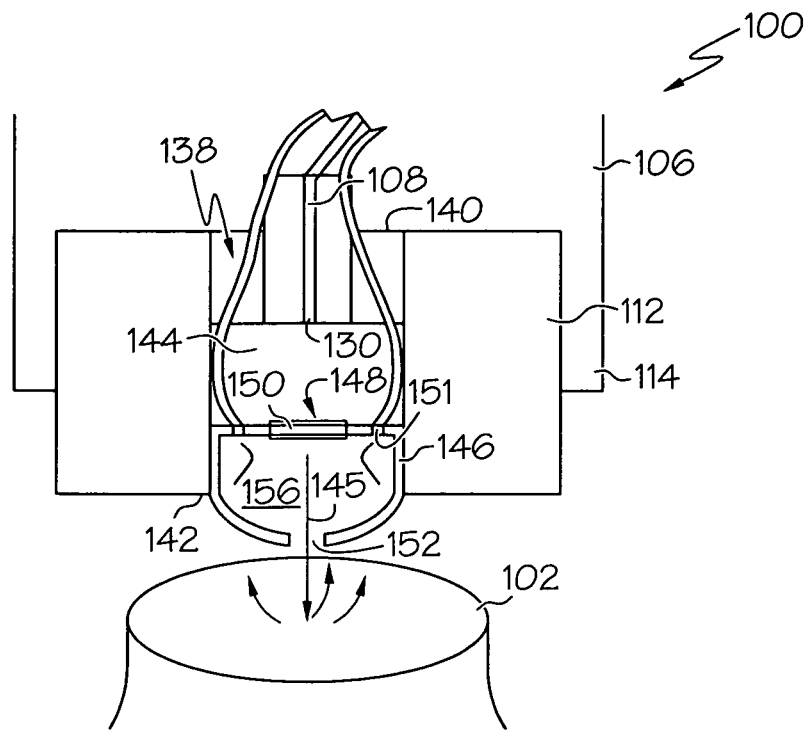
FIG. 2 is a close up view of an exemplary focusing head that may be used with the automated welding apparatus of FIG. 1.

Turning to FIG. 2, a close up view of a portion of the apparatus 100 including the focusing head 112 is illustrated. As mentioned briefly above, the focusing head 112 is mounted to the free end 114 of the arm 106 and as shown in FIG. 2, includes a passage 138 that extends between an inlet 140 and an outlet 142. A portion of the passage 138 houses at least a portion of the fiber optic cable 108, a focusing lens 144, and a shield 146. The focusing lens 144 is disposed proximate the exposed end 130 of the fiber optic cable 108 and is positioned such that the laser light is directed through the lens 144. It will be appreciated that the focusing lens 144 focuses the laser light to form a laser beam 145 and thus, has a magnification that is selected based, in part, on a desired strength of the laser beam 145.

The shield 146 is mounted to the focusing head 112 and, for example, is disposed at least partially in the focusing head passage 138. The shield 146 may be constructed from any one of numerous rigid materials, such as, for example, aluminum. Additionally, the shield 146 has an inlet 148 that includes a barrier lens 150 disposed therein for protecting the focusing lens 144 from debris or particles that may inadvertently enter the focusing head passage 138. Further, the shield 146 includes an outlet 152 that is aligned with the shield inlet 148 and configured to allow the laser beam 145 to be directed therethrough without obstruction. Additionally, one or more gas openings 151 may be included in any portion of the shield 146 to allow inert gas from the channel 134 to flow into a space 156 defined by the shield 146.

In one embodiment, as shown in FIG. 2, the shield 146 is configured to cooperate with the barrier lens 150 to protect the focusing lens 144 from debris or particles. In this embodiment, the shield 146 is cup-shaped and the diameter of the shield inlet 148 is greater than the diameter of its outlet 152. Preferably, the inlet and outlet 148, 150 are particularly sized to maintain positive pressure in the space 156 and around the barrier lens 150 so that particulate that may be present external to the focusing head 112 are prevented from entering the focusing head passage 138.

Figure 3:
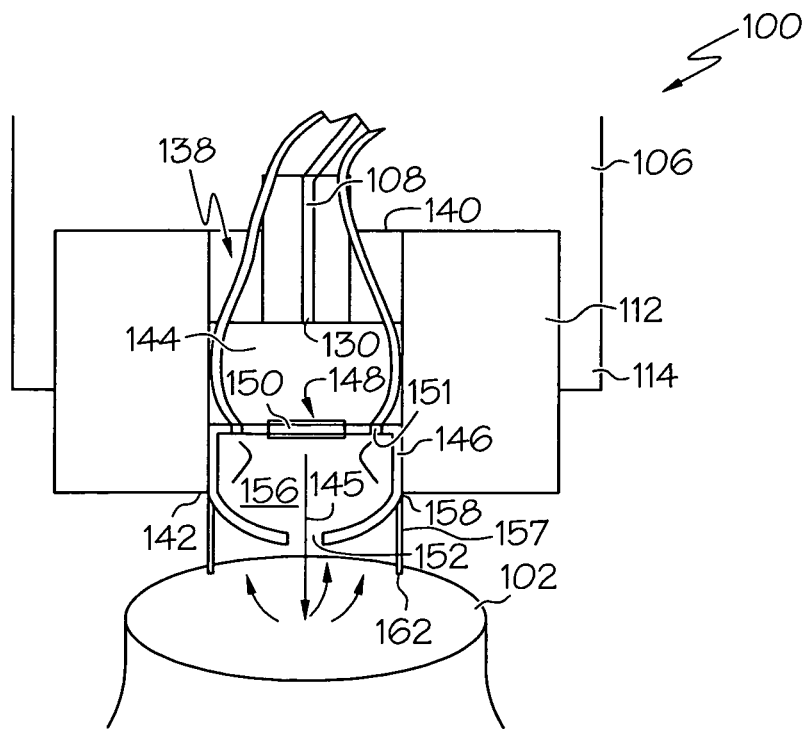
FIG. 3 is cross section view of an exemplary shield that may be implemented onto the focusing head depicted in FIG. 2.
Figure 4:
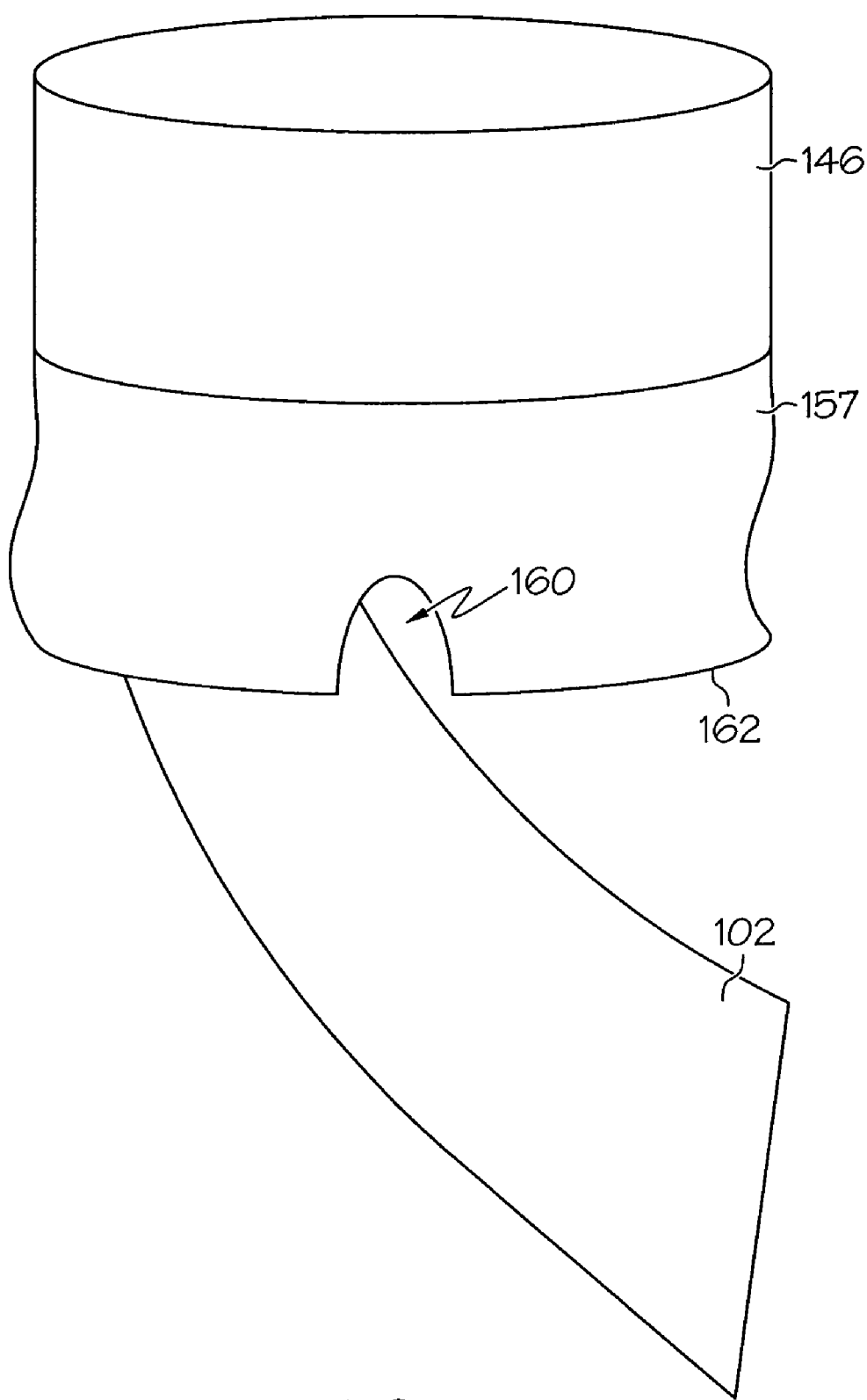
FIG. 4 is a view of another exemplary shield including an exemplary skirt coupled thereto.

To adequately direct the inert gases at the work piece 102, a skirt 157 may be coupled to the shield 146, as shown in FIG. 3. In one exemplary embodiment, the skirt 157 is tube-shaped and one end 158 thereof is coupled to and disposed around the shield 146. The skirt 157 may be adhered or otherwise coupled to the shield 146 proximate the shield outlet 152. Preferably, the skirt 157 is made of a flexible material capable of maintaining structural integrity at temperatures of at least about 200° F. (about 90° C.). Suitable materials include, but are not limited to high temperature rubber or other polymers, high temperature fabrics such as aluminized rayon, or Kevlar® (available through E.I. DuPont de Nemours Co. of Delaware) having a fiber density that is sufficient to prevent the flow of gas contaminants therethrough. Thus, if the skirt 157 inadvertently contacts the work piece 102 while it is being welded, the work piece 102 will not become damaged. To avoid contact with the work piece 102, as shown in FIG. 4, the skirt 157 may include a notch 160 formed at its other end 162.

The notch 160 may have any suitable shape. For example, in a case in which the work piece 102 is an impeller blade, the notch 160 may be U- or V-shaped to allow a portion of a blade of the impeller to be received therein.

Figure 5:
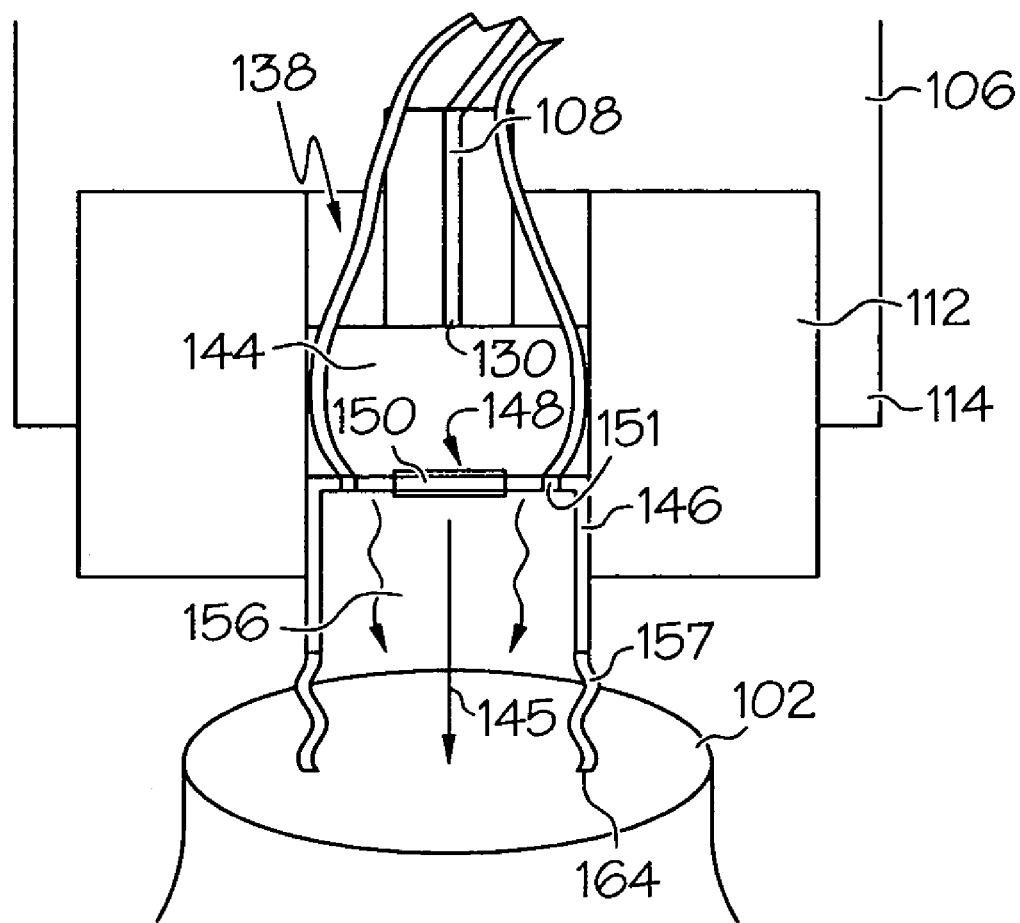
FIG. 5 is a cross section view of yet another exemplary shield including an exemplary skirt coupled thereto.

In an alternative embodiment, as shown in FIG. 5, the shield 146 is tube-shaped and the skirt 157 extends therefrom. In this embodiment, the shield 146 and the skirt 157 cooperate to direct and maintain the inert gas over the work piece 102. Similar to the embodiment above, the skirt 157 here is preferably constructed of a flexible material and may be coupled to the shield 146 in any one of numerous manners. The skirt 157 may also include a notch 160 formed on one of its ends 164. In yet another embodiment, the skirt 157 is directly coupled to the focusing head 112.

There has now been provided an automated welding apparatus 100 that includes a shield 146 that is capable of preventing particles from depositing on the fiber optic cable 108. Additionally, with the addition of the skirt 157, the apparatus 100 directs inert gas around the laser beam 145 and at the work piece 102 in an adequate manner. Additionally, the skirt 157 prevents the focus head from directly contacting the work piece 102 and is flexible so that it does not damage the work piece 102 when contacted therewith.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An automated welding system for welding a workpiece, comprising:
   an arm having an end, the arm configured to move multiaxially;
   a fiber optic cable coupled to the arm;
   a laser source coupled to the fiber optic cable and configured to supply laser light thereto;
   a focusing head including a first end, a second end, and a passage extending therebetween, the first end coupled to the arm end, and the passage receiving at least a portion of the fiber optic cable therein;
   a focus lens disposed within the focusing head passage and in communication with the fiber optic cable, the focus lens configured to focus the laser light from the fiber optic cable to form a laser beam; and
   a shield being cup-shaped and having a first end, a second end, an inlet, an outlet, and a cavity formed therebetween, the first end including the inlet, the second end having a rounded inner surface forming the shield cavity and including the outlet, each of the inlet and the outlet having a diameter, the shield inlet coupled to the focusing head second end, the shield inlet diameter being greater than the shield outlet diameter, the shield outlet diameter sized to provide an opening through which the laser beam exits, and the shield inlet diameter and the shield outlet diameter configured to maintain positive pressure within the shield cavity to thereby prevent substantially all particles external to the shield cavity from entering therein.

2. The automated welding system of claim 1, further comprising:
   a gas system configured to provide inert gas to the shield cavity.

3. The automated welding system of claim 1, further comprising:
   a barrier lens disposed at least partially within the focusing head passage between the focus lens and the shield outlet, the barrier lens disposed within the shield inlet.

4. The automated welding system of claim 1, further comprising:
   a platform configured to receive the workpiece, the platform disposed proximate the arm and configured to move multiaxially relative to the arm.

5. The automated welding system of claim 1, further comprising:
   a flexible skirt coupled to and disposed around at least a portion of the shield.

6. The automated welding system of claim 5, wherein the flexible skirt comprises rubber capable of maintaining structural integrity at temperatures of at least about 90° C.

7. The automated welding system of claim 5, wherein the flexible skirt and the shield are adhered to each other.

8. The automated welding system of claim 5, wherein the flexible skirt includes a first end and a second end, the first end coupled to the shield and the second end including a notch formed therein for receiving a portion of the workpiece.

9. An automated welding system for laser welding a workpiece, comprising:
   an arm having an end, the arm configured to move multiaxially;
   a fiber optic cable coupled to the arm;
   a laser source coupled to the fiber optic cable and configured to supply laser light thereto;
   a focusing head including a first end, a second end, and a passage extending therebetween, the first end coupled to the arm end, and the passage receiving at least a portion of the fiber optic cable therein;
   a shield being cup-shaped and having a first end, a second end, an inlet, an outlet, and a cavity formed therebetween, the first end including the inlet, the second end having a rounded inner surface forming the shield cavity and including the outlet, each of the inlet and the outlet having a diameter, the shield inlet coupled to the focusing head second end, the shield inlet diameter being greater than the shield outlet diameter and the shield outlet diameter sized to provide an opening through which the laser beam exits, the shield inlet diameter and the shield outlet diameter configured to maintain positive pressure within the shield cavity to thereby prevent substantially all particles external to the shield cavity from entering therein; and
   a flexible skirt coupled to and disposed around at least a portion of the shield.

10. The automated welding system of claim 9, further comprising: a barrier lens disposed within the shield inlet.

11. The automated welding system of claim 9, further comprising:
    a gas system configured to provide inert gas to the shield cavity.

12. The automated welding system of claim 9, further comprising:
    a focus lens disposed within the focusing head passage in communication with the fiber optic cable, the focus lens configured to focus the laser light from the fiber optic cable to form a laser beam.

13. The automated welding system of claim 9, further comprising:
   a platform configured to receive the workpiece, the platform disposed proximate the arm and configured to move multiaxially relative to the arm.

14. The automated welding system of claim 9, wherein the flexible skirt comprises rubber capable of maintaining structural integrity at temperatures of at least about 90° C.

15. The automated welding system of claim 9, wherein the flexible skirt and the shield are adhered to each other.

16. The automated welding system of claim 9, wherein the flexible skirt includes a first end and a second end, the first end coupled to the shield and the second end including a notch formed therein for receiving a portion of the workpiece.

* * * * *